United States Patent
Lindsay

(10) Patent No.: US 12,038,940 B2
(45) Date of Patent: Jul. 16, 2024

(54) ARCHITECTURE FOR DATA MAP CONVERTERS

(71) Applicant: OPEN TEXT HOLDINGS, INC., San Mateo, CA (US)

(72) Inventor: Walter Hughes Lindsay, Phoenix, AZ (US)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 0 days.

(21) Appl. No.: 17/471,998

(22) Filed: Sep. 10, 2021

(65) Prior Publication Data

US 2022/0075796 A1 Mar. 10, 2022

Related U.S. Application Data

(60) Provisional application No. 63/076,796, filed on Sep. 10, 2020.

(51) Int. Cl.
G06F 16/25 (2019.01)
G06F 16/178 (2019.01)

(52) U.S. Cl.
CPC ........ *G06F 16/258* (2019.01); *G06F 16/1794* (2019.01)

(58) Field of Classification Search
CPC .................... G06F 16/258; G06F 16/1794
See application file for complete search history.

(56) References Cited

U.S. PATENT DOCUMENTS

| 9,576,015 | B1* | 2/2017 | Tolnay | G06F 16/258 |
| 2003/0088543 | A1* | 5/2003 | Skeen | G06F 40/12 |
| 2004/0060003 | A1* | 3/2004 | Mani | G06F 40/154 |
| | | | | 715/234 |
| 2006/0277029 | A1* | 12/2006 | Green | G06F 16/258 |
| | | | | 704/4 |
| 2008/0320012 | A1* | 12/2008 | Loving | G06F 16/213 |
| 2013/0339403 | A1* | 12/2013 | Chao | G06F 16/258 |
| | | | | 707/821 |
| 2014/0089459 | A1* | 3/2014 | Werr | H04L 67/1097 |
| | | | | 709/217 |
| 2018/0113922 | A1* | 4/2018 | Gulwani | G06F 16/258 |

* cited by examiner

*Primary Examiner* — Kris E Mackes
*Assistant Examiner* — Lin Lin M Htay
(74) *Attorney, Agent, or Firm* — Sprinkle IP Law Group

(57) ABSTRACT

A reusable converter framework provides a set of tools for (1) loading existing data formats and transformation instructions of a source technology and (2) enabling the result of step (1) to be queried through Java code and analyzed. The source technology may follow a particular data transformation strategy such as data-drive, script-driven, or query driven. The reusable converter framework has a Java representation, referred to herein as an interpreted form, that can hold the information of a target technology, which follows a different data transformation strategy. The source and target technologies operate on different computing platforms having different computing environments. The interpreted form is utilized in step (3) to streamline and optimize the information from step (2) and produce a working data map suitable for the target technology.

20 Claims, 8 Drawing Sheets

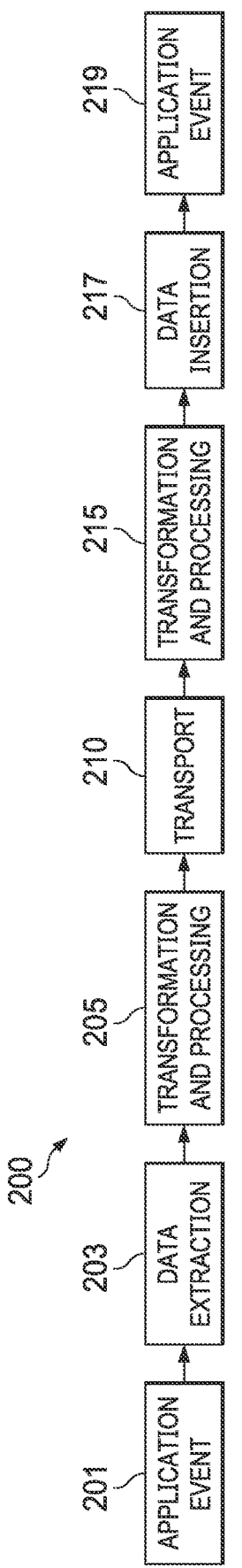
FIG. 2
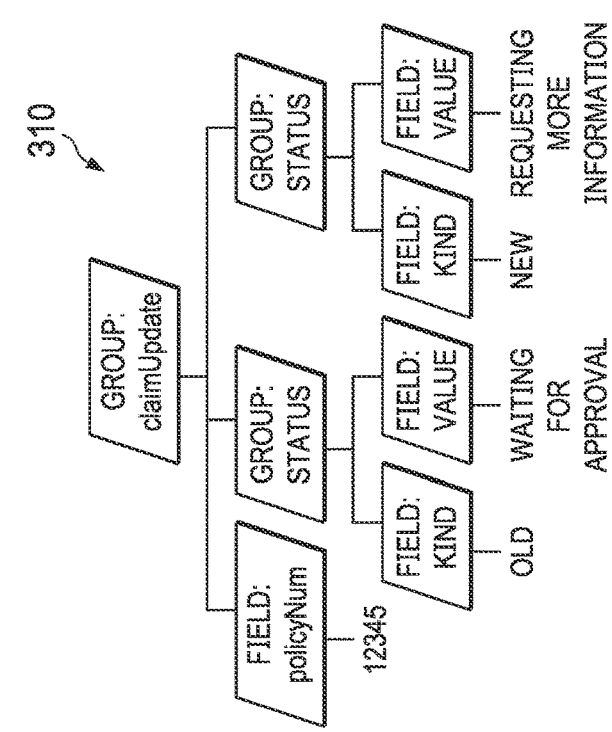
FIG. 3A
FIG. 3B

ARCHITECTURE FOR DATA MAP CONVERTERS

CROSS-REFERENCE TO RELATED APPLICATION(S)

This application claims a benefit of priority under 35 U.S.C. § 119(e) from U.S. Provisional Application No. 63/076,796, filed Sep. 10, 2020, entitled "ARCHITECTURE FOR DATA MAP CONVERTERS," which is hereby fully incorporated by reference herein.

TECHNICAL FIELD

This disclosure relates generally to data processing. More particularly, this disclosure relates to data transformations and data integrations between different computing platforms. Even more particularly, this disclosure relates to architecture, systems, methods, and computer program products for converting data maps used by different computing platforms.

BACKGROUND OF THE RELATED ART

As computer technologies evolve, enterprises often have to move their data integrations and/or processing operations that are already running in a computing platform to another computing platform. More than data migration, this platform-to-platform movement can be quite complex, complicated, and costly. This is because when an enterprise's solution (e.g., a data integration or other processing operation) runs in a computing environment particular to a computing platform, that computing environment enables complex programmatic actions to take place on the computing platform. Those complex problems can be solved in many different ways, and each creator of a computing platform chooses some of them.

Accordingly, porting an enterprise's solution from one computing platform running in one computing environment to another platform running in a different computing environment requires that the new computing platform has the same external behaviors as the old computing platform, but often must provide the behaviors in a way natural to the new computing platform. Because different computing platforms often take different approaches to solve even the same or similar problems, converting from one set of approaches to another is very challenging.

SUMMARY OF THE DISCLOSURE

As alluded to above, often the hardest single thing to move a system from an old computing platform to a new one is the "data transformation" that takes data in one format and converts it to another. A data mapping tool is usually used for this task. Such a data mapping tool, referred to herein as a transform, often utilizes a data map, which can be composed of multiple files. In this context, a "map" specifies how to convert a document or a set of records from one format into another. For instance, a map might convert database records that were dumped into three comma-separated values (CSV) files into a single extensible markup language (XML) document.

This disclosure provides a reusable converter framework through which data map converters can be written or otherwise built to take as input a data map written for one computing environment and produce a different data map suitable for a different computing environment. Accordingly, in an aspect, the invention can be characterized as an architectural converter or data map converter for converting data maps from one computing architecture to another. In another aspect, because converting data maps from one computing architecture to another takes place at the system level, the invention can also be characterized as a system converter capable of converting a source system into a target system. In yet another aspect, since these systems represent different technologies having different computing environments, the invention can also be characterized as a technology converter capable of converting a source technology into a target technology, for instance, converting an input structure of a source data map that follows a script-driven data transformation strategy to an output structure of a target data map that follows a query-driven data transformation strategy.

In some embodiments, the reusable converter framework can include a set of tools for (1) loading existing data formats and transformation instructions (which can be collectively referred to as "original definitions") of a source technology and (2) enabling the result of step (1) to be queried through Java code and analyzed. The source technology may follow a particular data transformation strategy such as data-driven, script-driven, or query driven. The reusable converter framework has a Java representation, referred to herein as an interpreted form, that can hold the information of a target technology. The source and target technologies operate on different computing platforms having different computing environments. For step (2), certain primitives can be used so that the person or team building the converter can interpret, for instance, via a user interface, the intent of the data read in by step (1). The interpreted form is utilized in step (3) to streamline and optimize the information from step (2) and produce a working data map suitable for the target technology.

In step (1), reading the data of the "text" of a transform is particular to a transform and is written in the format of a specific source transformation technology. In step (2), querying and analyzing the results of the query is particular to the transform and is organized by the principles of the translation technology. Matching the document structures of the transform with target document structure definitions (for both the input to and output from the transform) with the result of the queries is enabled by the underlying system (which is supported by the reusable converter framework), but is also particular to a transform. In step (3), once this information is provided to the underlying system, rendering the intention of the transform into a quality target data map is highly reusable between converters. The system provides the place and functionality to help with the very difficult task of interpretation and provides space for creativity on the part of the team building the target data map converter. Individual data map converters can then be built using the reusable framework.

In some embodiments, a method for converting a source technology to a target technology can include loading, by a converter executing on a processor, definitions from the source technology and conversion configuration information for converting the source technology to the target technology, the source technology specific to a source computing environment. The converter may represent the definitions from the source technology in an intermediary format internal to the converter. The definitions thus represented may include transformation instructions having a plurality of components. The converter may build a register of objects representing the plurality of components, with references linking the objects to one another such that the transformation instructions are queryable through a user interface. The transformation instructions are then matched to an output structure usable by the target technology. The converter then extracts relevant transformation logic from the definitions as constrained by the conversion configuration information and stores a generalized representation of the relevant transformation logic in an interpreted form. As a non-limiting example, the interpreted form can include assumption(s), rule(s), and/or hint(s) described using constructs such as symbols, commands, and expressions.

In some embodiments, the converter is configured for identifying an intention of the transformation instructions, the identifying comprising querying and manipulating the interpreted form storing the generalized representation of the relevant transformation logic. As a non-limiting example, manipulating the interpreted form can include compressing a plurality of instructions extracted from the definitions into a single instruction, for instance, removing an IF statement, combining statements, and/or reshaping the plurality of instructions into an efficient data transformation model for the target technology.

In some embodiments, the converter is configured for extracting, from the interpreted form, transformation logic required by the target technology. This can include, for instance, querying the interpreted form for statements describing behaviors of the target technology such as field mappings, looping, validation, etc. From here, the converter can generate an artifact containing the transformation logic. The artifact defines a data map which is usable by the target technology to generate a transform runnable in a target computing environment. In some embodiments, the source technology comprises a data-driven data transformation tool or a script-driven transformation tool. In some embodiments, the target technology comprises a query-driven transformation tool. The target computing environment can be distinctly different from the source computing environment.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 2 is a block diagram showing an example of an end-to-end data flow in application event processing involving data transformations.

FIG. 3A shows an example of a document in XML syntax.

FIG. 3B shows an example of a structure of the document shown in FIG. 3A.

DETAILED DESCRIPTION

Figure 1:
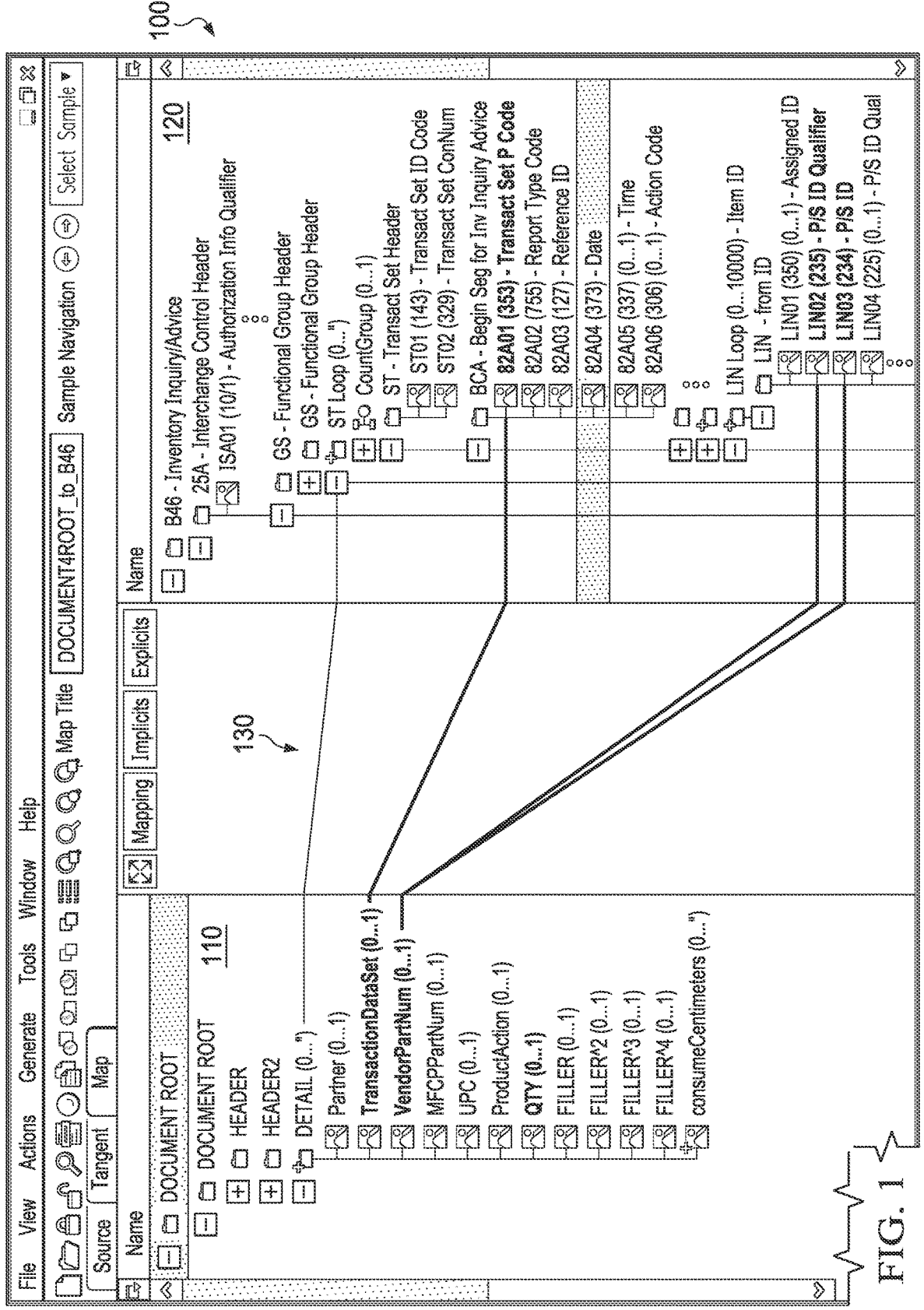
FIG. 1 is a screenshot of an example user interface of a data transformation tool.

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Before discussing the invention in detail, a discussion on the terminology used herein might be helpful. In this disclosure, "input" and "output" are often used to refer to data, and "input structure" and "output structure" are often used to refer to the structure to which the data conforms. The term "transform" is often used to refer to the artifact that can take the input data and generate the output data. The term "map" is often used to refer to the artifact that a human or automation creates, that a human can manipulate, and that can be used as a transform. In the context of the invention disclosed herein, a "map" or "data map" specifies how a data transformation tool or system can convert a document or a set of records from one format into another.

As a non-limiting example, a transform is a runnable object that can generate out of the artifact that defines a data map. A data map or transform might take several inputs, including reference data, and might make external calls to systems to get data. It might produce multiple outputs, and might even update external systems by making calls or by updating reference data.

For the purpose of illustration and not of limitation, this disclosure discusses a single document as input and a single document as output. However, in practice, this need not be the case. The invention disclosed herein can make use of the definition of a data map built in a third-party data transformation tool (which can be referred to as a source technology) and convert it to another data transformation tool (which can be referred to as a target technology). The source and target technologies may have distinctly different computing environments. The definitional information (e.g., data formats and transformation instructions) is often held in files, referred to herein as "definitions," but can also be held in a database. The "text" might actually be a set of records in a database, but is referred to herein as "text".

As alluded to above, often the hardest single thing to move from one computing platform to another is the "data transformation" that takes data in one format and converts it to another. In this disclosure, the term "converter" refers to the automation technology that takes a data map defined in a third-party data mapping tool and outputs an implementation that behaves the same, but that runs on a different computing platform.

FIG. 1 is a screenshot of an example user interface of a data mapping and translation tool 100 which serves as an example of a data transformation tool. A data transformation tool like this one generally follows a specific data transformation strategy to create specifications for data usage and map data between various structured formats and standards. Examples of transformation strategies include the data-driven transformation strategy, the script-driven transformation strategy, and the query-driven transformation strategy. Data transformation tools allow organizations and enterprises alike to reconcile data diversity by extracting value out of data for various purposes such as application integration.

Data Transformation Model

As a non-limiting example, data mapping and translation tool 100 may utilize a data transformation model which models the results for a given input document. The data transformation model, which aligns with FIG. 6 described below, performs these operations:

1. Organizes the transform in terms of the target document metadata.

2. For each group (real or virtual) in the target metadata:

If it is loop associated, then for each associated source group in the real data, the model processes a target group and its children. If it is not loop associated, the model processes a single target group and its children.

3. For each mapped target field (real or virtual) that needs processing, the model performs the mapping:

If a rule exists, it runs the rule and then validates the target data.

If no rule exists, and the field is mapped to a source field, it attempts to move the source field's data to the target field and then validates the target data.

4. Performs structural checks on the fields and groups of the target document. Validates the format of data in target fields. For every required field that did not get a value assigned in (3) above:

If the field has a default value, it moves the default value to the field.

If the field does not have a default value, it creates the field but does not assign it a value.

Mapping Rules

As a non-limiting example, data mapping and translation tool 100 may have a set of rules available for use. A rule can be used during mapping to specify how to construct the proper output for a target field. Here, a rule is a sequence of commands associated with a target field. A rule can be called while processing a field mapping. As explained below, a rule is executed at runtime and identifies a mapping operation to be performed. Rules work on operands, such as a source field, a numeric literal, or a target field value. Operands are converted to generic types (string or double) during the execution of a rule. After the rule executes, the output operand is converted to the required output type.

For example, at run time, moving data in a source field to a target field at runtime may involve the following:

When a source field is fetched, a runtime engine reads the data value and prepares it for use by the runtime engine. The source field data is then validated and stored in the runtime engine as a string or numeric value.

For an implicit rule (or a Move rule that moves data from a source field to the target), if the target field is numeric, the source value gets converted to a number and stored in the target field. If the target field is a string, the source field is brought in as a string, and the value gets converted from the source Type and Presentation to that of the target.

For string-to-numeric conversion in variables and arguments during rule processing, the input format of the string data is assumed to have Presentation double. For number-to-string conversion, the output format is assumed to have Presentation double. When converting between string and double, " " is converted to NaN and vice versa. In Presentation double, all decimal places are shown, integer values have no trailing "0.0", and very large or small numbers may have an exponent in the string representation of the number.

When a rule puts data in the target field, the target field stores its data as either a string or a number, but not both. If the target value is converted from string to number, the target value gets validated before conversion (and if validation fails, the rule fails and the user sees an error). If the target value is converted from number to string, the value is formatted in the target field's Type and Presentation. When a rule fetches data from the target field, if the data is already in the right form (string or number), the value is fetched. If conversion is required, the runtime engine does so as described above.

After rule processing, if the target field has no data, but is "required" and has a default value, the default value is used. The runtime engine validates the output and then converts it to the output format.

In the example of FIG. 1, input structure 110 describes the form of the incoming data, output structure 120 describes the form of the outgoing data, and mappings 130 show how nodes in input structure 110 might map to nodes in output structure 120 (which are not necessarily one-to-one mapping). A data transformation tool like the one shown in FIG. 1 can be used to specify how to parse incoming data, rearrange and alter values in the data, and generate an output document in an outgoing data format.

However, in general, a data transformation tool cannot make use of the definition of a data map built in a third-party data transformation tool, particularly if the third-party data transformation tool follows a different data transformation strategy. That is, if input data map is structured for a data-driven transformation and output data map is structured for a script-driven data transformation, the definition(s) for the input data cannot be used by a script-driven data transformation tool.

The invention disclosed herein can make use of the definition of a data map built in a third-party data transformation tool and convert it to for another data transformation tool. That is, a data map converter disclosed herein can read in the definition of a data map (which can also be referred to herein as the original definition of a source technology) used by a first kind of data transformation tool configured for a source computing environment and generate an equivalent data map having an output structure suitable for a target computing environment. The source and target computing environments can be distinctly different from one another.

The resulting data map (which is referred to herein as a "target data map") does not need to be perfect as a human can test and complete the programmatically-generated target data map. A data map converter disclosed herein enables the creation of a new data map in significantly far less time than a person could do it manually. The term "data map" is used here to refer to a particular kind of artifact from which a particular kind of runnable object, which is referred to herein as a transform, can be generated.

A data map or transform might take several inputs, including reference data, and might make external calls to systems to get data. This allows the underlying system to generate additional processing steps in the target computing environment.

Creating a high-fidelity converter is notoriously difficult. The landscape is littered with converters that demoed well but did not befit projects. This disclosure focuses on converting data transformations and takes a new approach to conversion. Below are some reasons why other converters had failed.

Earlier attempts of converters worked like a language translator tool—read the artifacts that defined the source conversion and generate the target conversion—that the approach fails to please. It's like translating a poem by translating the words.

The invention takes a play production approach to data map conversion. A data map is not so much a text, which is static (even though it tends to be recorded in files and can be read, if one really wants to read it), but instead is an artifact that does something and acts a certain way. A data map may act more like a stage production in which the actors tell a story and the audience responds and the actors hear the response and respond back. A stage production does something, it is not static.

Producing a play typically starts with the text. People read the text. The producer and director select the cast based on the text and on their vision of the production—for instance, they might decide that Romeo and Juliet will be set in the 1920's. In the first rehearsals, the cast will often sit and read the play (it's called "tablework") and will often discuss their characters. Absorbing what is given is the start, and that is done with some eye on where they want to go.

As a second stage, the director will start blocking the play and the actors hold the script and say their lines as they move around the stage. The relationship between things becomes more apparent. For instance, if Romeo were shorter than Juliet, they might have to stage the balcony scene differently than if Romeo were much taller. Choices about the details of a scene late in the play might require that an earlier scene be performed in a certain way. The director and cast both are focusing on choosing the meaning, the interpretation, of the text and how the actors interact. But it is not yet a production.

The third stage is when the lighting team, stage crew, costumers, take lead, and so on focus on all the things that are needed around the interpretation, culminating in the dress rehearsal.

On the opening night, the audience can respond, and the cast, director, stage crew etc. all learn how the audience receives the play. The play is slightly fine-tuned to become a honed performance.

From this perspective, building data map converters is much more like a play production than it is like translating a piece of text. A data map converter takes something that has worked and lived and gives it new life. A conversion architecture below works for an existing transform T that runs in a third-party data transformation tool:

(1). Text and Casting: read the document definitions and the conversion rules as they are in T. If there is a well-known format, such as an Electronic Data Interchange (EDI) transaction, a definition of that is often provided from the target mapping tool and the data in T is related to the well-known format. That is, in the first step, the text is loaded as it is and is made queryable (e.g., by building a registry of objects in a distinctive intermediary representation).

(2). Interpretation: in this stage, a person has coded mechanisms to query the data that has been loaded, which is in an intermediary representation, and mechanisms to interpret based on query results. Often there can be clear relationships between some input field of data Fs and some output field of data Ft, and those can be directly queried (e.g., through the registry). This is similar to translating a text. However, the value in this stage is to reflect on the subtle relationships and interactions between things in T in order to identify the intent or the result the things in T will produce. That is, in this stage, the user is interpreting the intent of the instruction set in T. The language of intention can be captured in code (e.g., Java).

(3). Production: once the intention of what the person who crafted T was trying to achieve has been interpreted, the system can render that understanding into the mechanisms native to the target data mapping/transformation tool. The information from stage 2 can be captured in a second intermediate form that is designed to capture transformation information in a flexible manner. In this stage, mechanical renderings of parts of T coded in the intermediate form often contain extraneous information (e.g., a redundant or unnecessary IF statement) and can be unusable. Thus, it can be very important to compress the instructions into clear, straightforward concepts that can be rendered into T. At the end, artifacts in the target data mapping/transformation tool's native form are generated.

Next, a user can use the artifacts generated in (3) along with test data to fine tune the results, to fill in gaps, etc., so that the result precisely replicates the behaviors of T.

In computing, various kinds of data transformations and processing can take place during application event processing. FIG. 2 is a block diagram showing an example of an end-to-end data flow 200 in application event processing.

In the context of the invention, end-to-end data flow 200 might be triggered by some application event 201 such as sending an invoice, sending an insurance claim, or any type of document communication. The information communication may include an attachment, for instance, an audio file, an image, a text file, etc. that accompanies and/or embedded in the document.

Generally, this type of application events often involves data extraction 203 (e.g., extracting an account number for an insurance claim, extracting a database table, etc.), transformation, processing (e.g., validation), and so on, by an originating application or database. The data associated with the application event is transformed via data transformation and processing 205 into an intermediary format so that the data can be transported (210), for instance, to a recipient application, system, database, etc.

At the recipient side, the data in the intermediary format is then processed, for instance, through a data transformation and processing operation 215 to conform to a recipient application or database. Further, a data insertion operation 217 may be performed to enrich or augment the data before it is used. For example, a purchase order received by the recipient application refers to a third-party product. The recipient application may attempt to obtain information about the third-party product and insert that information in the purchase order. As another example, the recipient application may operate to validate a reference, a part number, or some details in a received document and update the document accordingly. Various kinds of processing can take place at this processing stage. An application event 219 is then triggered so that the data (which is now enriched and in a format suitable for processing by the recipient application or database) can be used by the recipient application or database. Data flow 200 shows the context of the invention for data integration within a company, in the cloud, or between companies (e.g., the originating application and the recipient application could be owned and operated by different entities, for instance, an insurance claim processing company and an insurance company).

FIG. 3A shows an example of a document 300 in XML syntax (which can be referred to as unparsed data). Following the above example, document 300 represents an insurance claim document. In this example, document 300 contains a type of metadata record (e.g., "status") that shows up multiple times in different groupings (e.g., an "old" status and a "new" status). Parsing document 300 shows these groupings in a group-and-field structure 310 (which can be referred to as parsed data), as illustrated in FIG. 3B.

The group-and-field structure illustrated in FIG. 3B is applicable to many kinds of data, such as relational database management system (RDBMS) data, JavaScript Object Notation (JSON) used in application programming interface (API) calls, EDI (Electronic Data Interchange) data used between companies, IBMi data used on legacy AS400 platforms, and in many other cases. This illustrates the representational power of transformations and processing addressed by the invention. A hierarchy of key-value pairs is another example of an implementation.

Before describing embodiments of the invention, examples of data transformation strategies will be described with reference to FIGS. 4-6, using document 300 shown in FIG. 3A and group-and-field structure 310 shown in FIG. 3B as examples. The different types of data transformations and processing may take place at either or both stages 205, 215 of data flow 200 shown in FIG. 2.

Data-Driven Transformation

Figure 4:
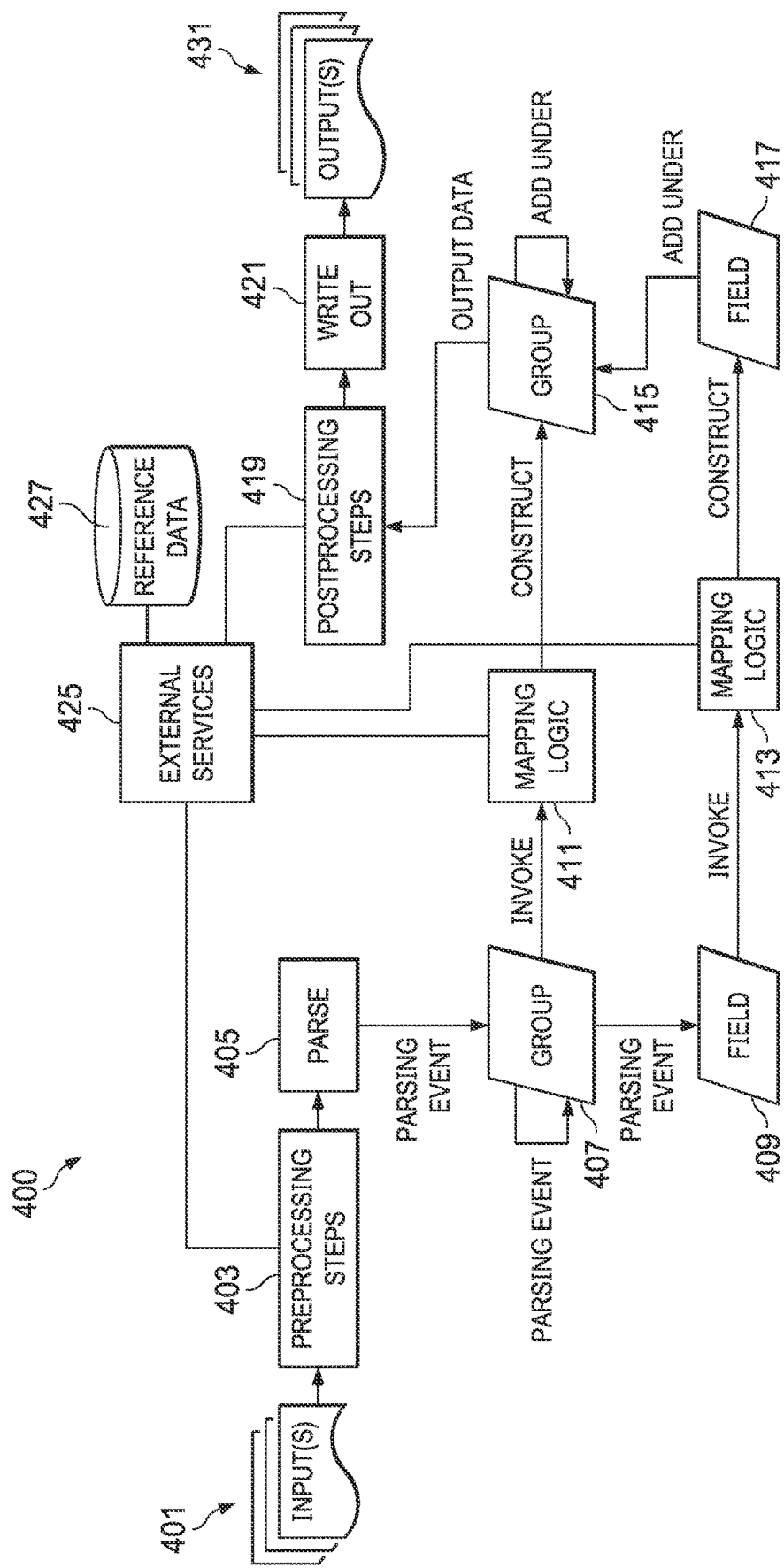
FIGS. 4-6 show examples of different types of data transformations and processing that may take place in a data flow.

FIG. 4 is a block diagram illustrating an example of a data-driven transformation (which is also referred to as source-centric transformation) operation 400. In the example of FIG. 4, a plurality of preprocessing steps 403 may be taken to prepare input data 401 (e.g., document 300 shown in FIG. 3), including running a script and/or calling external services 425 for reference data 427, to complete and/or validate input data 401. As the data is parsed (405), parsing events are generated with respect to each group (407), field (409), etc. These parsing events take place as the underlying processing system traverses (e.g., via a depth-first traversal) the data structure of the input data (e.g., group-and-field structure 310 of document 300), forming a hierarchy of nodes and branches. The hierarchy, which allows for nesting of groups, can have associated mapping logic (e.g., mapping logic 411, 413) attached to certain specific locations.

As the system reaches a node, it may look for any associated logic. As a non-limiting example, MAL namespaces are used tor providing uniquely named dements and attributes in an XML document. The necessary XML namespaces can be registered and saved in a register. The system can use XPath to identify and navigate nodes in the source data (e.g., document 300, which is an example of an XML document). XPath is a query language for selecting nodes from an XML document. XPath is known to those skilled in the art and thus is not further described herein. In this way, the system can traverse the elements and attributes in the input data, select a node representing an element or attribute, and determine whether and what logic applies. For instance, for the node representing field 409 (e.g., "kind"), the system may determine that mapping logic 413 should be invoked or otherwise triggered. As such, the system may proceed to apply mapping logic 413 to the node representing field 409. Mapping logic 413 may provide an appropriate script, declarative, or instruction set for the associated node (e.g., take appropriate action if the field under processing "kind" has a value of "old").

This process occurs as the source data is read in. At each node, the system determines whether any mapping logic applies and, if so, applies the mapping logic deterministically. As the input data is being processed, the output data is constructed. As shown in FIG. 4, output data 431 is constructed from mapped group 415 and mapped field 417, processed through postprocessing steps 419, and write out 421. Data-driven transformation tools capable of performing data-driven transformation operation 400 are known to those skilled in the art and thus are not further described herein.

In some cases, the transformation may take a script-driven approach. In the above example, parsing of the input data and application of logic to the nodes depend largely on the order in which the input data is read. In a script-driven transformation operation, construction of the output data follows a script provided by the mapping logic. This is illustrated in FIG. 5.

Script-Driven Transformation

Figure 5:
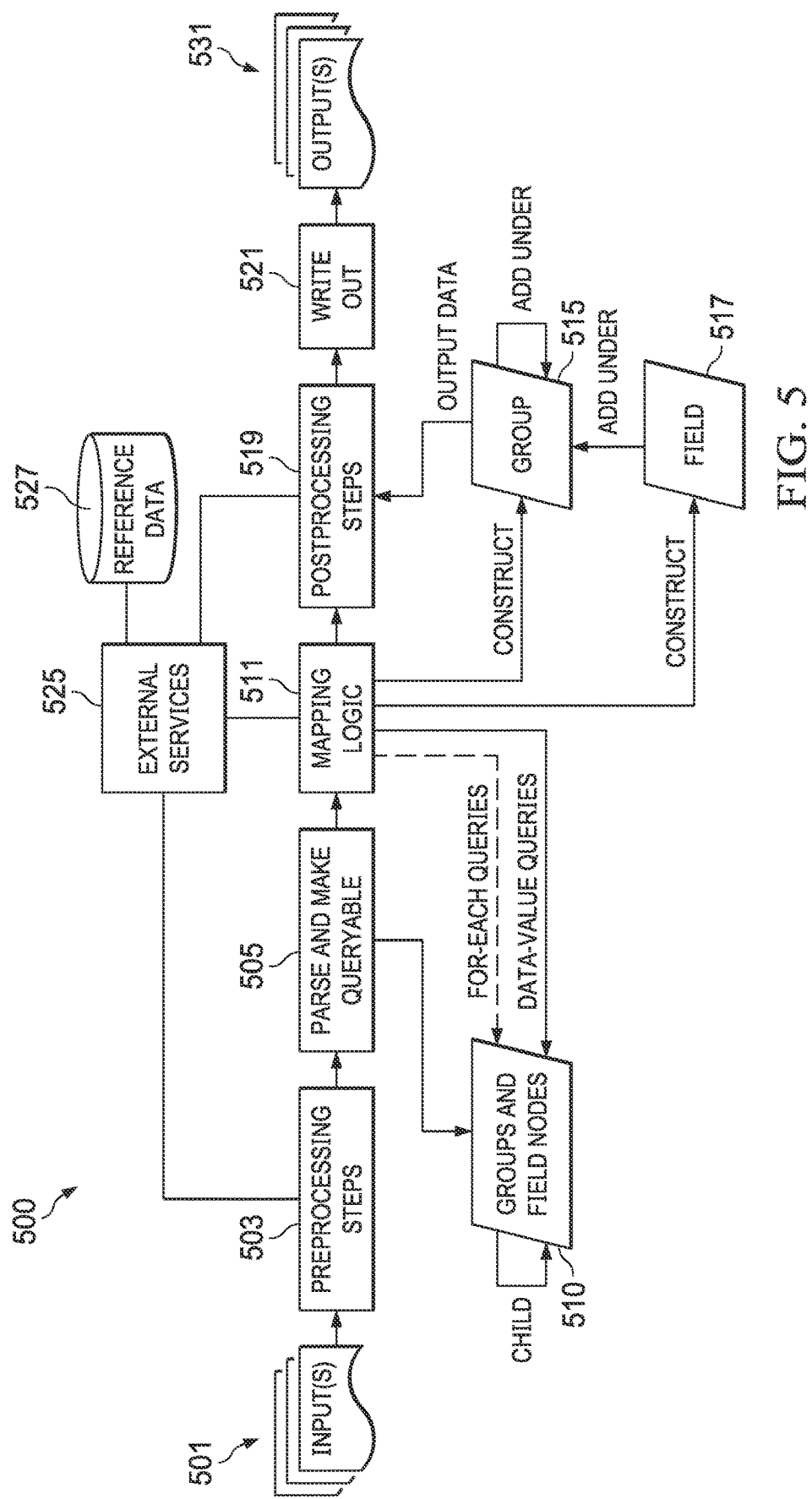

FIG. 5 is a block diagram illustrating an example of a script-driven transformation operation 500. Skilled artisans appreciate that many data transformation tools can load the input data in memory and then run a script on the input data.

In the example of FIG. 5, mapping logic 511 queries input(s) 501, preprocesses the input(s) 503, and parses and makes input(s) 501 queryable (e.g., adding more information such as building a registry of objects referencing other objects) (505). Mapping logic 511, in this case, includes a script that queries against input(s) 501 (e.g., groups and field nodes 510) and constructs the output data (e.g., mapped group 515, field 517, etc.) accordingly. Where necessary, mapping logic 511 may leverage external services 525 for reference data 527. Some queries return sets of input records and are used in for-each processing. Other queries return data values, often as constrained by the current context of for-each processing. As the script runs, it can explicitly construct the output data and perform post-processing steps 519 (e.g., data validation, etc.) and write out 521. Script-driven transformation tools capable of performing script-driven transformation operation 500 are known to those skilled in the art and thus are not further described herein.

Query-Driven Transformation

In a query-driven transformation (which is also referred to as target-centric transformation) operation, the system follows a target structure that needs to be built. In such a case, the system applies logic that traverses the declared output structure of the data and queries the input data. For instance, in the target structure, different sets of rules might be associated with different nodes such that, if the field "kind" has a value of "old," a first set of rules might be applied; whereas, if the field "kind" has a value of "new," a second set of rules might be applied. If specified, a for-each query can run as an output structure is encountered, causing multiple instances of that output structure to be created. This approach is illustrated in FIG. 6.

Figure 6:
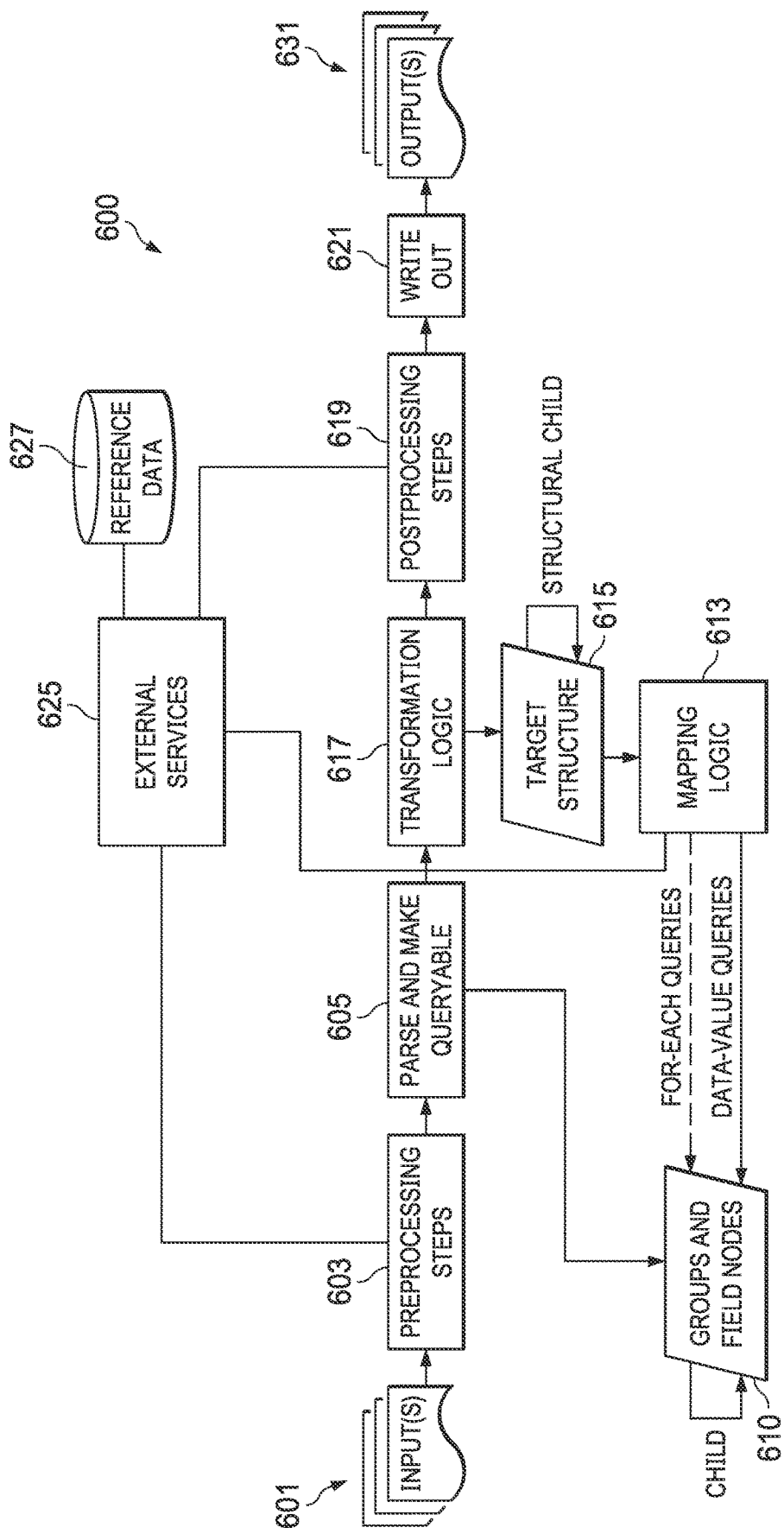

In the example of FIG. 6, input(s) 601 is pre-processed (603) and parsed into queryable form (605). Mapping logic 613, in this case, traverses target data structure 615 and queries groups and field nodes (610). Where necessary, mapping logic 613 may leverage external services 625 for reference data 627. Transformation logic 617 then takes parsed, queryable input data 605, applies target structure 615, performs post-processing steps (619), and write out (621) output(s) 631. Target-centric transformation tools can provide scripts for processing data so that the processed data can be appropriately inserted into database tables. This kind of transformation can be helpful in enterprise data integrations. Query-driven transformation tools capable of performing query-driven transformation operation 600 are known to those skilled in the art and thus are not further described herein.

Data Map Conversion

Data transformation tools, such as those described above, are seen as significantly different from one another. As such, while they exist for mapping data between various structured formats, they are not exchangeable or compatible. Currently, no solutions exist to automatically convert data maps used by these distinctly different data transformation tools. The invention disclosed herein provides a reusable framework through which data map converters can be written or otherwise built to take a data map written for one execution environment as input and produce a different data map suitable for a different execution environment. Essentially, the invention converts a source system (which is also referred to herein as a source technology) into a target system (which is also referred to herein as a target technology). An example of a data map conversion process using the reusable framework is illustrated in FIG. 7.

Figure 7:
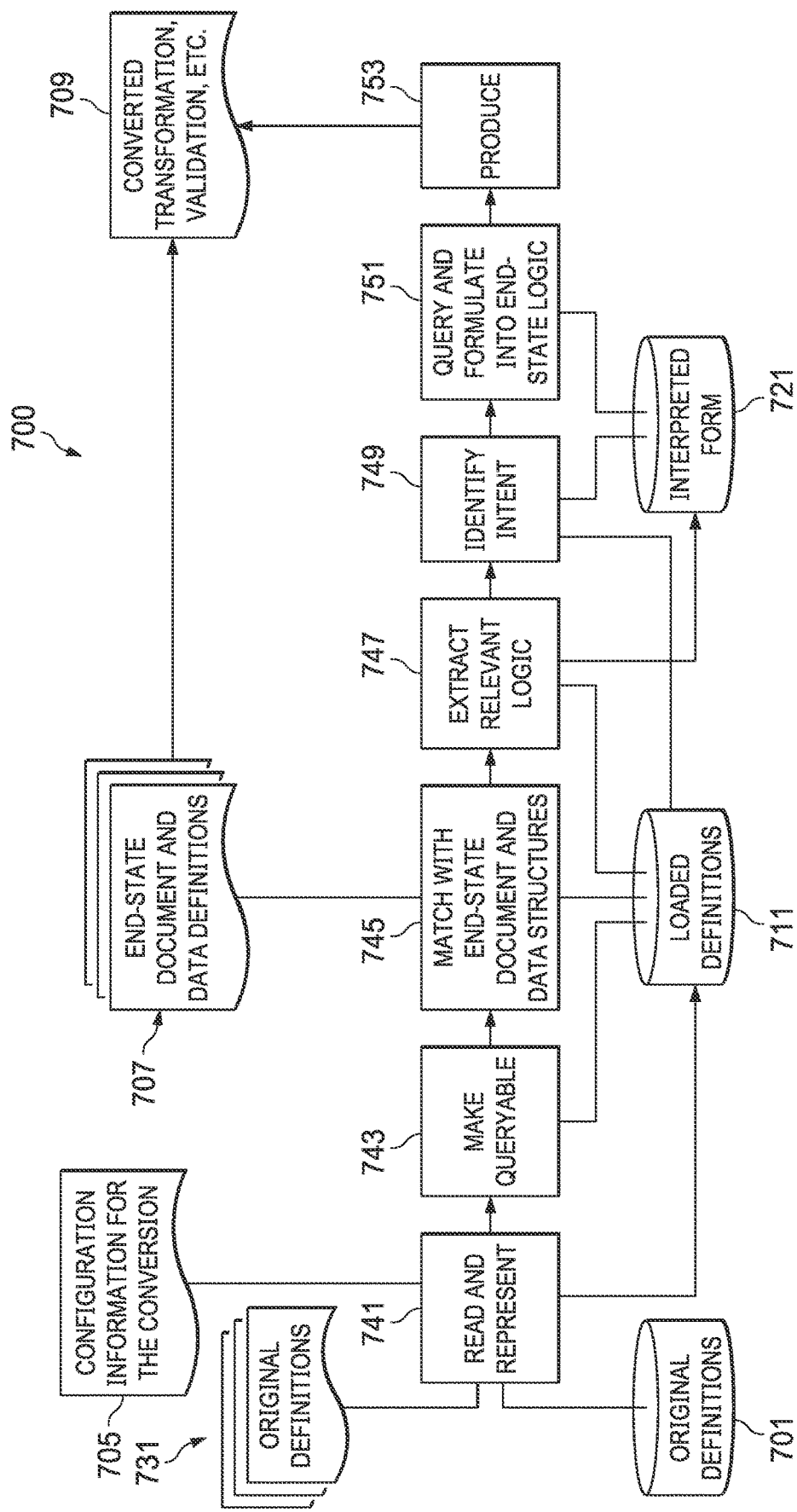
FIG. 7 is a block diagram showing an example operation of a data map converter accordingly to some embodiments.

FIG. 7 is a block diagram showing an example of a data map conversion operation 700 according to some embodiments. As illustrated in FIG. 7, data map conversion operation 700 can include a plurality of processing stages for processing original definitions of a source technology (e.g., a source data transformation tool or system) to thereby produce artifacts 709 (e.g., transforms, validation, etc.) that can be used in a target technology (e.g., a target data transformation tool or system) operating in a desired target computing environment. The input and output data for a data map written in the source technology can be of various kinds, e.g., JSON, XML, EDI, etc. The source technology may provide the input data in a parsed form (e.g., having a data structure 310). The original definitions may be specified in XML files, text files, tables, etc. The original definitions may specify what logic is attached to what node, what queries to run, and so on. As discussed above, such definitions can vary greatly from data transformation tool to data transformation tool.

Read and Represent (741): At this stage, the system reads and loads the artifacts or reports (e.g., original definitions 731) and document or database structures (e.g., original definitions 701) of a source technology as specified in configuration information 705. The end result is the information-as-it-is of one or more transformations and other processing from the source technology. The information-as-it-is may be represented in an internal intermediary format and stored (e.g., as loaded definitions 711).

Make Queryable (743): At this stage, the system organizes, indexes, and categorizes the information-as-it-is so that later processing can analyze and query the data. As discussed above, this can include adding more information to loaded definitions 711, for instance, building a registry of objects from the information-as-it-is.

Match with End-state Document and Data Structures (745): At this stage, the system matches the information-as-it-is to target document structures, RDBMS table structures, etc. (e.g., end-state document and data definitions 707). The system relates those structures referenced by the information-as-it-is with the structures as represented by a target data transformation technology. The system may update loaded definitions 711 accordingly.

Extract Relevant Logic (747): The original definitions 701, 731 might contain information that is not relevant for the desired transformation. For example, a Java-based, multiplatform enterprise integration platform may perform thousands of transformations utilizing thousands of scripts. However, there might only be a few scripts that are relevant to loaded definitions 711. Accordingly, the system extracts the relevant logic as constrained by the configuration information 705. The end result is a generic or generalized representation (e.g., a Java representation) of the relevant transformation logic (and other logic, such as for data validation etc.). The system stores this representation as interpreted form 721.

Identify Intent (749): At this stage, the system queries the loaded definitions 711 and queries and manipulates interpreted form 721 in order to identify the intent of operations (that were supposed to be performed by the source technology). For instance, if some output group has two or more independent mapping logics, each of which can generate instances of that output group, then those groupings of logic are flagged so that the target data transformation tool (which can be query-driven or target-centric) can be configured with independent sets of logic for the single output group.

Query & Formulate into End-state Logic (751): At this stage, the system extract logic from the interpreted form for mapping, validation, etc. as required by the target technology. Suppose the target technology is target-centric, the validation logic can be organized differently, for instance, by different principles.

Produce (753): At this stage, the system generates artifacts 709 that can perform the desired processing. An artifact thus generated would contain the transformation logic particular to the target technology. That is, the artifact defines a data map that can be used by the target technology to generate a transform runnable in a target computing environment. As discussed above, the target computing environment may differ from the source computing environment.

Figure 8:
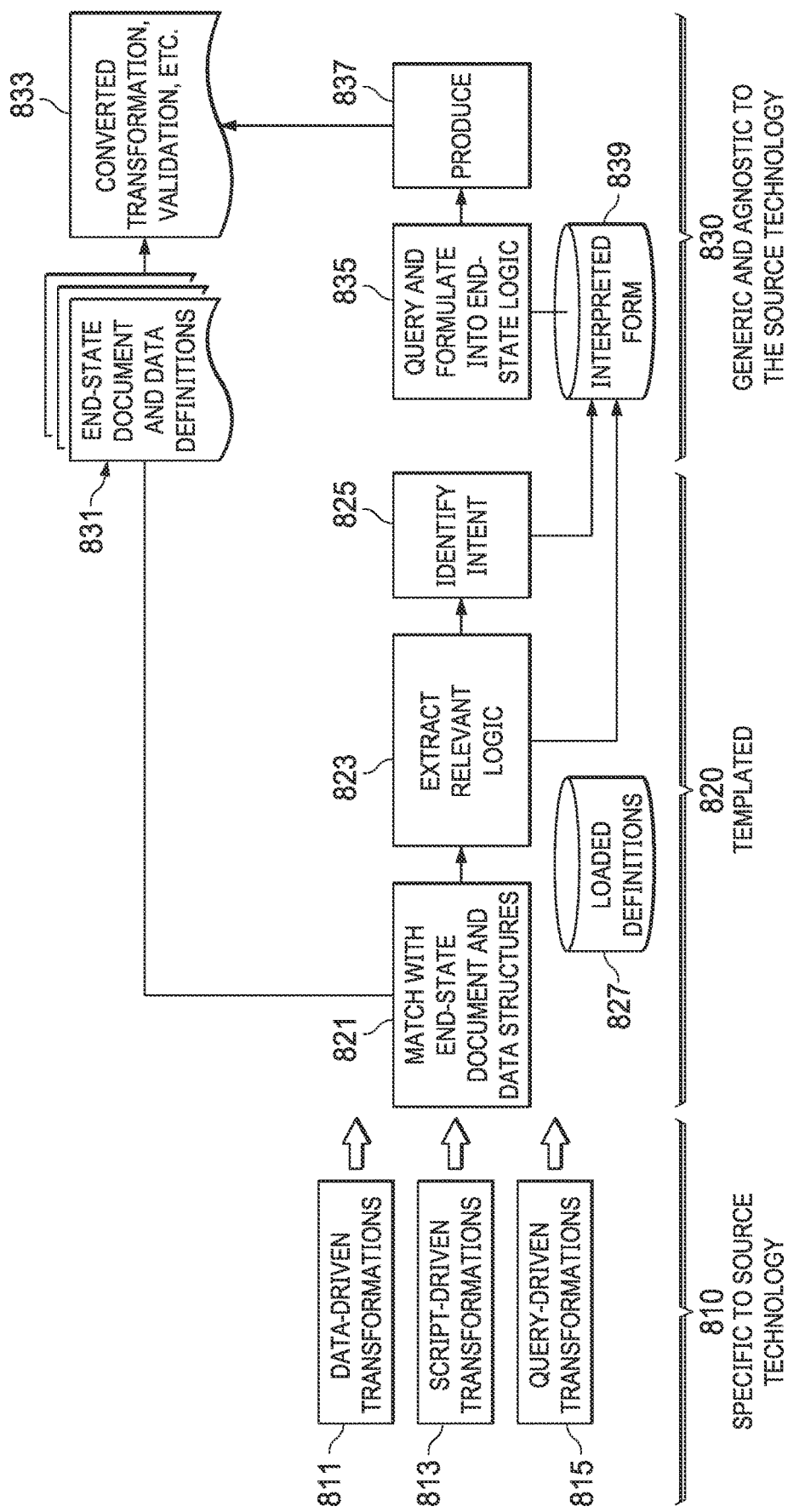
FIG. 8 is a block diagram showing another view of the data map converter of FIG. 7 according to some embodiments.

FIG. 8 is a block diagram that takes a different view of data map conversion operation 700. As illustrated in FIG. 8, at an input stage 810, source-specific transformations 811, 813, 815 are distinctly different from one another. At an intermediary stage 820, steps 821, 823, 825 are templated—they follow common patterns and use common code, but require that behaviors be plugged in to read the artifacts of the source technology's transforms and to make that data queryable. This stage produces loaded definitions 827 that can be used to extract relevant logic. The later stages (830) are generic (i.e., steps 831, 835, 837 and interpreted form 839 are agnostic to the type of input data) and work for any of the kinds of source technologies such as the various kinds of data transformation tools discussed above. The artifacts 833 thus produced can be used by the target technology.

As a non-limiting example, a source data transformation tool may be an advanced data mapping tool that operates by scanning input data and executing transformation code as it scans the input data. As the input data is read, data values that are read in are processed by the code. This means that the code runs top to bottom, and are structured to process the input data values as they are read in. If the input has a repeating structure (e.g., the line items in a purchase order or doctor visits made by a patient) where multiple records of data have the same data fields, but have different values in the fields, that part of the transformation code will run as many times as there are input data records.

The target data transformation tool operates differently. It attaches transformation logic to places in the output structure. The transform runs by traversing the output structure (from top to bottom—see FIG. 1). The person writing the transform can assume that the entire input data is available prior to any of the transformation code starting to run.

In this case, the source data transformation tool is "source-centric" (i.e., driven by the input data in order to populate the output data structure) and the target data transformation tool is "target-centric" (i.e., the operations are controlled by the output data structure and querying the input data). In other conversion projects, even converting a target-centric data map into a target-centric data map can have many complexities. Examples below show converting source-centric data maps to target-centric data maps.

In a source-centric data map, as the code runs, it can populate variables with data (and the value in the variables can be accessed by later steps in the code) and it can generate output data. Like virtually every translator, the advanced data mapping tool can also have branches in logic with IF statements, can query external reference data, and can massage values such as with math operations like addition or string operations like concatenation. However, when a person is developing a data map in the advanced data mapping tool, there are some output structures that cannot be populated with these techniques or that could be populated but only with convoluted code. For instance, the following can be addressed via convoluted logic using the mechanisms described here:

if the input has a repeating structure like address records and the input data has a shipping address and a billing address, but either could be first in the data;
the target must specify the shipping address and then the billing address.

In this case, if the input data has the billing address first, then the fields of data of the billing address can be put into variables. The shipping address will be generated to the output when it is seen in the input data. If the billing address comes second in the input data, the code can populate the variables, and then the billing address variables can be output.

In another case, if the input has a set of records that each represents a doctor visit the patient makes, and the output has a field that indicates the number of visits that were made, followed by a record for each doctor visit, then the mechanisms described above cannot produce the output. The output count-of-doctor-visits field can only be populated by scanning the input records. If the maximum number of visits a patient might have had is unknown, the code cannot generate the necessary output with the mechanisms described so far.

Thus, the source-centric advanced data mapping tool has an additional mechanism—lookahead. It allows some regions of the input data to be scanned and variables set, and then scanned again for normal processing. For the addresses, the lookahead will scan both address records and then normal processing will just write them out. For the number of visits, the lookahead just counts the number of visits and then normal processing just writes them out.

The target-centric data transformation tool has mechanisms to select and directly map the two kinds of address records without needing to do complex logic or lookahead. However, like the source-centric advanced data mapping tool, it does need to scan the doctor visit records in order to calculate the count. However, it performs that by creating a special "logic group" with data fields that allow transformation logic to be attached (so that the lookahead happens by putting the logic group before the number-of-visits field, the lookahead sets a variable, and then setting the number-of-visits field to the value of that variable).

Depending on the situation, a lookahead in the source-centric advanced data mapping tool can be handled in more than one way in the target-centric data transformation tool. In many cases, using the logic group mechanism could work, but would make the generated target transform very hard to work with—a human building the target data map often would never build the data map that way, but would instead use the input-data-selection mechanisms mentioned above.

A mechanical conversion of the source-centric transform to the target-centric transform will often produce an unusable result. Only by step (2), interpretation, can the differences in intent of constructs such as lookahead be identified so that the generated map can be easy to work with and so will be used in projects instead of being re-written by hand.

In addition, the source-centric advanced data mapping tool can read an input value, set a variable, and later use that variable for transformation logic and/or use that value to populate an output data field. With the target-centric data transformation tool, in most cases a mapper can just use the target user interface, drag the input field to the output field, and the data will be moved. A naive translation of a map from the source-centric advanced data mapping tool to the target-centric data transformation tool would produce rule text that sets the variable and then puts the variable into the target.

Step (3), Production, does generate the rule, but it then analyzes the rule to compress/streamline it. In this case, the rule is streamlined so much that the rule is eliminated. This example here is very streamlined; in many situations of converting from one to another, complex logic can often be eliminated or converted into a very streamlined rule.

To show the generality of this approach, suppose a source computing platform provides the idea of a "pipeline" of name value pairs, where a "value" can contain data values or can contain other name-value pairs. It has process steps that look at data in the pipeline and can make decisions, such as to repeat an action until a condition is met. Further suppose that a document structure has a header record and one or more detail records under. It is likely that one "map" process step will be used for the header. A loop operation will invoke a second map once per line item, and the results will be combined into an output document. It is even possible that one or both maps are reusable, and can be called by different processing logic as needed. The computing platform is process-centric and multiple data maps can be combined into one or more independent target-centric data transformation maps.

The input and results of the converters discussed here can be represented as texts—and often it is actually a text that is read into the converter. But fundamentally, it entails taking a complex mechanism (e.g., a source data map) built on top of another complex mechanism (e.g., a translation engine) which together can transform data. A goal here is to produce a different complex mechanism (i.e., a target data map) on a different complex engine (e.g., another translation engine) that does the same things as the original data map.

This conversion process is much less like translating a text than it is like producing a play. The playwright did write a text, but in his or her mind, he or she was seeing a play and was writing down the script, and the director and cast need to produce a stage play in different circumstances. In this sense, translating a poem from one language to another could be performed by identifying what the text in the original language means and the techniques it uses to affect the reader and then to focus on the meaning and technique while rendering the poem into the new language (while still trying to be faithful to the text of the original poem). The Invention takes this approach as a software architecture and produces a reusable framework so that converters can be written to take maps written for one execution environment and produce target-centric data maps for a different execution environment. Individual converters can then be built using the invention.

The reusable converter framework has standard tools for (1) loading existing data formats and transformation instructions of a source technology and (2) enabling the result of step (1) to be queried, analyzed, etc. For step 2, there are certain primitives that can be used so that the person or team building the converter can interpret the intent of the data read in by step (1). In other words, reading the data of the "text" of a transform is particular to a transform, but matching that with existing document structure definitions has some tooling. For step 3, a Java representation of the information processed so far is utilized to streamline and optimize that information and produce a working data map suitable for the target technology. Rendering the intention of the conversion into a quality data map is highly reusable between converters. Having the place and some tooling to help with the very difficult task of interpretation provides space for creativity on the part of the team building the converter.

While the invention is described above as an automation technique, it has an embodiment as code in which a hardened converter is produced from a source-centric advanced data mapping tool to a target-centric data transformation tool. In some embodiments, a partial converter may use parts of the framework. In some embodiments, the framework is used to convert multiple data maps (e.g., hundreds, thousands, etc.) to target-centric data transformation tools.

In some embodiments, a transform includes instructions inside a Java object, also referred to as Java runnable code, which is machine-readable and which is not human-readable. A data map, however, contains descriptive information that is human-readable. As discussed above, in the source-centric advanced data mapping tool, six to seven files make up a data map. In some cases, producing a data map may entail reading hundreds of files. Such a data map can be implementation-dependent.

The invention disclosed herein allows for simultaneous transformation in which source instructions are taken and converted to a target instruction set. More specifically, artifacts (e.g., "original definitions") are read as they are and represented in an intermediary format in an intake process (step 1). Such definitions can include data formats, transformation instructions, etc. for the source technology. Such source instructions can include components, which can be represented as objects. Cross-references are then built to link the loaded objects to each other (e.g., in a registry of objects with identifiers). In this way, querying the registry will return references (e.g., pointers) that point to the objects. Once the instructions are read and a registry of different components of the instructions is built so that they reference each other, a user interface (UI) can be provided to a user to query the registry (e.g., through an API to walk the structure and get every artifact that affects a variable in the instructions set).

For instance, suppose an instruction i=i+1 where the variable is i and where the instruction intends to set the variable. A converter developer will have written logic to query the registry and view the complex relationships over the entire map and determine what is the intention of this instruction.

In step 2, the converter logic can access the data and artifacts (e.g., definitions, input sample data, output sample data, etc.). For instance, suppose a document identifier has a sequence of three numbers, the system can trace the data structure and follow the relationships among links and show the information via the UI. Through logically equivalent but different representations in their data structures, the user (e.g., a map converter coder) tries to figure out what was the intent. This can result in the converter organizing the results of step 1 in an abstract or mathematical description that captures the intention. In some cases, the intention can be captured in the form of an object (e.g., Java object) that describes the intention of what the human coder (of the source data map) wants to achieve. In some embodiments, the intention is recorded or otherwise captured in an interpreted form.

Results from step 2 are in a language of intention that would be different from what the data was read in. That is, the converter interprets the data in a language of intention in code (which entails a set of Java objects that describe this generic language—an abstract representation in the sense that is suitable for mathematical manipulations needed to do in order to reduce the instructions in the set).

The system then takes this generic representation of the intentions of the person who wrote the third-party data mapping tool, performs data manipulation(s) (e.g., compressing 30 instructions into 1 instruction which can involve removing an IF statement, and/or combining statements, branching, organizing, reshaping instructions fundamentally, etc.) to reduce the instructions in the set, renders into an instruction set for the target data transformation tool (e.g., in a target-like language) and generates a transform (in runnable code). This step involves deeply massaging the data into an efficient data transformation model and can be repeatable.

This efficient data transformation model (e.g., in the form of a manipulated instruction set) represents a machine-readable language of the intentions. For instance, the system may search backwards through sequences of instructions, identify descriptive construct that affects a value, and determine what statements in the source are involved in order to produce the value in a single output field.

Here, the heuristic is based on the output structure and, since the system knows the output structure, the system traverses backwards and only searches what is relevant. The system then eliminates extraneous steps, resulting in a leaner language of intention (which can be viewed as a global model) with hierarchical arrangements (e.g., of properties). Human programmers do not have time and/or capability to produce such machine-readable instructions.

EXAMPLE— Conversion of Data-Driven Transformation to Query-Driven Transformation Data-driven, script-driven, and query-driven transformation strategies are all designed to accept one or more input data files and produce one or more output data files. However, as discussed above, these transformation strategies involve distinctly different mapping logics. The examples below show that the invention can work with any of these transformation strategies. For the sake of discussion, XPath notation will be used for these examples, i.e., slashes indicate the steps from a root of a document to locations in a document.

Suppose a goal is to place a value held in a specific location in the input document into a global variable. Specifically, the value in the data field "/Input1/Group1/Field1" is to be stored as a global variable $Val1. Note that the transform may use $Val1 in other mapping logic not mentioned here. In some cases, the person could potentially have coded in that step and never used $Val1. Further, there could be a side effect of doing that operation, such as verifying that Field1 has a value, and this operation might have been included in order to generate an error if Field1 did not have data. There may be other reasons why this statement is included, and this foreshadows the discussion of "hints" below, specifically, that what is to be put into an "interpreted form" describe what the operation actually does. This is further discussed below.

As a second example of mapping logic, the computer's system date may be formulated with the value stored in a location in the target. Here, it is desired to store the value into the field/Target1/Header/DocumentDate.

As a third example of mapping logic, a value in an input document may be located (e.g., in the field/Input1/Group1/DocumentNumber) and placed into the correct place in the output document (e.g., into the field/Target1/Header/DocNo).

To describe the transformation that follows, the following terms will be used:
  Groups: the names of groups are followed by {and}, with the relevant part of the transform between the curly braces
  Fields: names
  Mapping Logic: that statement that is placed inside square brackets. Child logic statements are also placed inside their own square brackets.
  Global variables: names start with a dollar sign $
  Assigning a value is indicated as →, where the value of the left is moved to the right
  Functions take arguments that are surrounded by parentheses, for instance:
    getSystemDate( )—returns the system date as known by the computer
    formatDate( )—takes two arguments; the first is a date, and the second is a format string for formatting the date value
  The above items of mapping logic can be represented in data-driven, script-driven, and
    query-driven forms as follows. All the logic will be organized based on the structure of Input1.
  Data-Driven

---

[ formatDate (getSystemDate ( ), "YYYYMMDD" ) -> /Target1/Header/DocumentDate ]
Input1 {
  Group1 {
    Field1 [ Field1 -> $Val1 ]
    DocumentNumber [ DocumentNumber -> /Target1/Header/DocNo ]
  }
}

---

Script-Driven
[/Input1/Group1/Field1→$Val1]
[formatDate(getSystemDate( ) "YYYYMMDD")→/Target1/Header/DocumentDate]
[/Input1/Group1/DocumentNumber→/Target/Header/DocNo]
Query-Driven

---

[ / Input1/Group1/Field1 -> $Val1 ]
Target {
  Header {
    DocumentDate [ formatDate (getSystemDate ( ), "YYYYMMDD" )
    -> DocumentDate ]
    DocNo [ /Input1/Group1/DocumentNumber -> DocNo ]
  }
}

---

As the above example demonstrates, although these transformation strategies define the same goal, they organize the steps differently, including:
  The data-driven approach has to assign the system date to DocumentDate disconnected from the structure. This assignment is represented here as a preprocessing step.
  The query-driven approach fetches the Field1 value disconnected from the structure. This assignment could be placed anywhere in the transform prior to the first use of $Val1, but is listed here as a preprocessing step.
  Fundamentally, in all three transformation strategies:
  Data is accessed
  Mapping logic commands are described
  Output data is produced
  Mapping logic can be far more complex, for instance, including check conditional information, check for and report error conditions, and so on. Below provides an example showing how mapping logic can be nested.
  Interpreted Form As discussed above, the invention records processing steps in an interpreted form, which can be similar to the script-driven representation described above, with differences. The interpreted form is highly self-describing and can unambiguously describe the behavior of the mapping steps. For example, an interpreted form may have the following two rules:
  [$Val1→/Target/Header/Val]
  [$Val2→/Target/Header/Val]
The system needs to determine which of the three incompatible interpretations to take:
  Two separate fields will be constructed and populated with information. In many situations, creating two Val fields is perfectly valid.
  One field will be constructed and will in the end hold the value of $Val2. The second operation overwrites the result of the first.
  Each source technology has assumptions like these. Therefore, a system implementing a converter disclosed herein needs to record the more precise behavior into the interpreted form.
  In the invention disclosed here, hints are used, each having a start and end tag which will be inside less than and greater than signs, <and >.
  In some embodiments, an interpreted form will by default take the second approach, i.e., one field will be constructed and in the end will hold $Val2. To indicate the first, a hint can be used, as in:
    <Optionally Construct Val
      [$Val1→/Target/Header/Val]
    >
    <Optionally Construct Val
      [$Val2→/Target/Header/Val]

>This hint indicates that if $Val1 holds a value, construct a Val field. And then if $Val2 holds a value, construct a Val field.

This approach allows the system to correctly describe the intention of the commands, since different source technologies being converted from can have very different assumptions about how the mapping logic is to operate.

The interpreted form described here also has assumptions. It needs to allow for the assumptions and intentions (e.g. 2 Val fields vs. 1) of commands to be recorded. In some embodiments, the assumptions of the intermediate model are biased toward the design of constructs of a target technology described in "OpenText Contivo Analyst," Reference Guide, 2021, 192 pages, which provides an example of a desired target data transformation tool and which is incorporated by reference herein. While this target technology is query-driven, the hints and other details of the interpreted form described above are not the same as the assumptions made by the target technology. However, the hints and other details of the interpreted form described above can be converted to the target technology.

Converting to the Interpreted Form

In some embodiments, the process of creating an interpreted form can be described as including: describing the mapping logic, what data is accessed, and what data is produced in a way that is flexible enough to record all the variety of the source technology, and that captures enough information so that the intent of the mapping logic is clear.

Referring to the example above concerning populating $Val1 with the value in /Input1/Group1/Field1, the source technology might perform validation, and require that Field1 hold a value else an error is raised. The converter for that source technology needs to record into the interpreted form the actual behavior, not just the nominal behavior that an assignment operation is occurring. If probing/Input1/Group1/Field1 would require that Field1 hold a value, that needs to be noted into the Interpreted Form (which has a way to represent those constraints).

Example Embodiment of the Interpreted Form

In this embodiment, three primary constructs are used in an interpreted form:

Symbols: A symbol represents things that can hold values, such as variables or locations in documents. For instance, if the Interpreted Form refers to a variable $Val1, or a location in a document/Input1/Group1/Field1, each will have a separate symbol. Some symbols may be environmental—created and managed by the transformation infrastructure. Some may be global, and some may be scoped. Symbols may have data types. These kinds of information can be registered when the interpreted form is constructed.

Commands: Indicate something to be done, such as the hints described above, assignment operations, for-each relationships, an if/then/else construct, etc. Commands can have child commands.

Expressions: Expressions specify how to manipulate values. In a conditional statement, a Boolean expression describes how to produce a true or false value. In formatting the system date into a string with a YYYYMMDD format, as in the example above, the expression is a function that takes a date value and a format string, and produces a string that represents the data value in the specified format. Adding two numbers is an expression. A single expression can contain literals, variables, functions, arithmetic operators, logical operators, and logical connectors. There are many kinds of expressions possible.

In addition, some source technologies have capabilities that exceed what a target technology can do. In this case, the invention allows the ability to plug in additional expressions in order to manipulate data in unanticipated ways. The person adding in the ability to convert from a source technology to a target technology can add in these extensions.

Converting from the Interpreted Form

To convert the definitions to the interpreted form, the system scans the symbols and commands, extracts the relevant portions, and generates target-centric equivalents as faithfully as possible.

Not everything in the interpreted form might end up in the generated target-centric transform. In the example above, where the interpreted form holds:

[$Val1→/Target/Header/Val]

[$Val2→/Target/Header/Val]

The system will eliminate the first command, which reads $Val1, since it is not needed. Similarly, if this command above is the only use of $Val1, then $Val1 will not be populated and will not appear at all in the generated transformation. As described above, the interpreted form is queryable so that the "field mappings", "looping" and other behaviors of the target technology can be extracted from the interpreted form to describe the needed behaviors.

In addition, if the source technology intermixes data transformation with other operations (such as various kinds of data validation, updated reference data if a new value is seen, etc.), those parts of the interpreted form can be written to a report or other artifacts—such as validation instructions—which can also be generated from the same interpreted form. That is, the interpreted form is not only designed to be extractible to the constructs of the target technology, it can be queried to extract Validation Rules, Error-Handling-and-Data-Enrichment rules, etc. For instance, when a new part or patient is encountered in a document, record that information in a table so that the additional needed information about that entity can be acquired.

In some cases, any time something is added to the interpreted form, either of two options can be taken:

Identify how to generate the constructs of the interpreted form to the constructs of the target technology Identify how to represent the something into a report so that the humans using the generated artifacts are aware that they need to test and perhaps manually fix the relevant behaviors At times, there can be a combination—the construct is generated into the target technology, but the report indicates that there are subtle differences between the source technology and the target technology that the converter does not at present address, drawing a human user's attention to the need that testing will be needed in that area.

Given the following interpreted form data:

[if (equals(/Input1/Group2/Field2, "102")

[/Input1/Group2/FieldA→/Target1/Body/Line/Identifier]

[/Input1/Group2/FieldB→/Target1/Body/Line/Quantity]

]

This example shows that a command can have child commands in the interpreted form. Suppose the target technology is query-driven, the converter will extract this information out of this snippet of interpreted form above (which, for the sake of brevity, all other parts of the resultant generated transform are not included here), the interpreted form will be queried and manipulated into this form:

```
Target1 {
    Body {
        Line {
            Identifier [ if (equals (/Input1/Group2/Field2,
                "102")
                    [ /Input1/Group2/FieldA ->
                    Identifier ]
                ]
            Quantity [ if (equals (/Input1/Group2/Field2,
                "102")
                    [ /Input1/Group2/FieldB ->
                    Quantity ]
                ]
        }
    }
}
```

As can be seen, this is a query-driven transformation, and the logic relevant to Identifier and Quantity is included in the context of that part of the target structure, but the if statement, which is applicable to both, is included for both.

Once this extraction step is completed, the target transform will be generated, and in this case, the mapping logic will be converted into a target mapping-logic syntax, which is a type of rule language:

```
Target1 {
    Body {
        Line {
            Identifier [ IF /Input1/Group2/Field2 = "102"
                MOVE /Input1/Group2/FieldA TO TARGET
                ENDIF ]
            Quantity [ IF /Input1/Group2/Field2 = "102"
                MOVE /Input1/Group2/FieldB TO TARGET
                ENDIF ]
        }
    }
}
```

A system implementing the framework or architecture disclosed herein is efficient in making sense of third-party data that comes in, so that programmers can review the information and be able to create a generic description (abstract). This intermediary output (e.g., the interpreted form or the object representation in a machine-readable language of intention from step 2) is used by the system to generate data map converters.

In a way, the conversion process described above can be considered a complex structural organization of the instructions so that the intention of the third-party coder (of the source data mapping tool) can be modeled for a desired target technology that runs in a different computing environment. Once the model of intentions is built, it can be re-used. Every use of the model improves the model.

Figure 9:
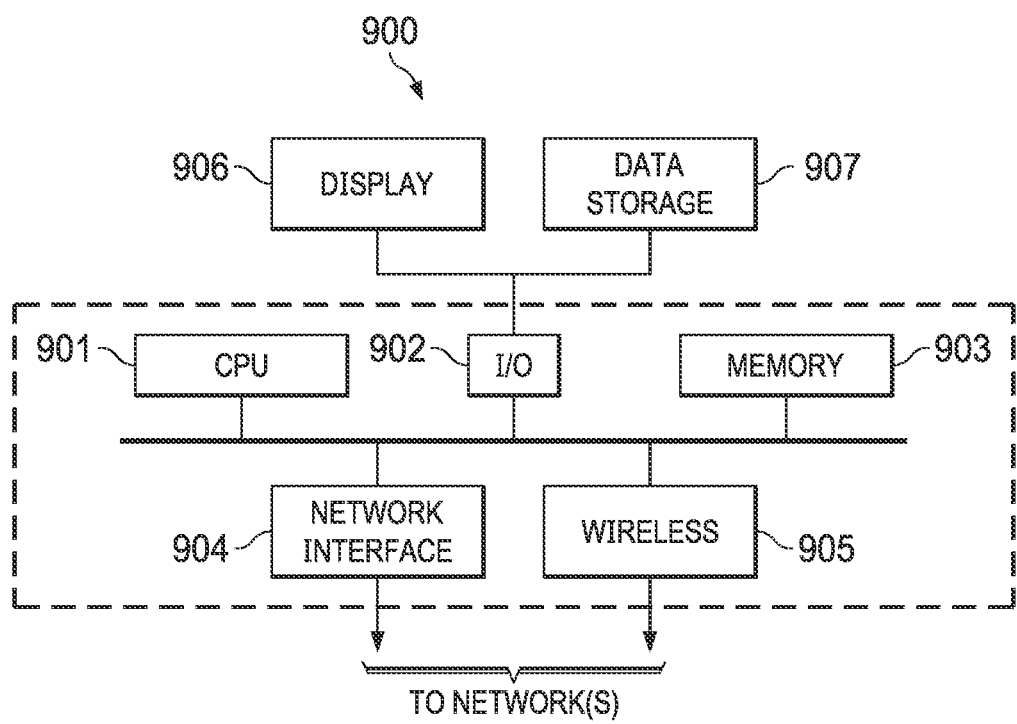
FIG. 9 depicts a diagrammatic representation of a data processing system for implementing an embodiment disclosed herein.

FIG. 9 depicts a diagrammatic representation of a data processing system for implementing an embodiment disclosed herein. As shown in FIG. 9, data processing system 900 may include one or more central processing units (CPU) or processors 901 coupled to one or more user input/output (I/O) devices 902 and memory devices 903. Examples of I/O devices 902 may include, but are not limited to, keyboards, displays, monitors, touch screens, printers, electronic pointing devices such as mice, trackballs, styluses, touch pads, or the like.

Examples of memory devices 903 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 900 can be coupled to display 906, information device 907 and various peripheral devices (not shown), such as printers, plotters, speakers, etc. through I/O devices 902. Data processing system 900 may also be coupled to external computers or other devices through network interface 904, wireless transceiver 905, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein.

The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines, or portions thereof described herein, where such software programming or code can be stored in a computer-readable medium and can be operated on by a processor to permit a computer to perform any of the steps, operations, methods, routines, or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electro-magnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals, or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. The scope of the present disclosure should be determined by the following claims and their legal equivalents.

What is claimed is:

1. A method, comprising:
  loading, by a converter executing on a processor as specified in conversion configuration information, definitions of a first data map built for a source technology, the source technology specific to a source computing environment, the loading including representing the definitions as loaded definitions in an intermediary format, the definitions including transformation instructions having a plurality of components;

building, by the converter through an object registry, cross-references that link objects representing the plurality of components such that the transformation instructions are queryable through the object registry by way of automation or a user interface;

matching, by the converter, an input structure of the first data map built for the source technology to an output structure that is usable by a target technology in a target computing environment;

extracting, by the converter, relevant transformation logic from the loaded definitions in the intermediary format as constrained by the conversion configuration information to thereby produce a generalized representation of the relevant transformation logic;

storing, by the converter, the generalized representation of the relevant transformation logic in an interpreted form;

identifying, by the converter, an intention of the transformation instructions, the identifying comprising:

querying, through the object registry, the loaded definitions in the intermediary format to ascertain relationships between input fields in the input structure of the first data map built for the source technology and output fields in the output structure that is usable by the target technology; and querying and manipulating the generalized representation of the relevant transformation logic in the interpreted form so as to identify the intention and store the intention in the interpreted form;

once the intention of the transformation instructions is identified, using, by the converter, the intention in the interpreted form to extract, from the relevant transformation logic in the interpreted form, required transformation logic as required by the target technology; and generating, by the converter, an artifact containing the required transformation logic, the artifact defining a second data map that is usable by the target technology to generate a transform runnable in the target computing environment.

2. The method according to claim 1, further comprising: compressing a plurality of instructions extracted from the definitions into a single instruction.

3. The method according to claim 2, wherein compressing the plurality of instructions comprises at least one of removing an IF statement, combining statements, or reshaping the plurality of instructions.

4. The method according to claim 1, wherein extracting the required transformation logic from the relevant transformation logic in the interpreted form comprises querying the relevant transformation logic in the interpreted form for statements describing behaviors of the target technology, the statements including at least one of a field mapping or looping.

5. The method according to claim 1, wherein the source technology comprises a data-driven data transformation tool or a script-driven transformation tool.

6. The method according to claim 1, wherein the target technology comprises a query-driven transformation tool.

7. The method according to claim 1, wherein the interpreted form comprises an assumption, a rule, and a hint.

8. A system, comprising:
a processor;
a non-transitory computer-readable medium; and
stored instructions translatable by the processor for:
loading, as specified in conversion configuration information, definitions of a first data map built for a source technology, the source technology specific to a source computing environment, the loading including representing the definitions as loaded definitions in an intermediary format, the definitions including transformation instructions having a plurality of components;

building, through an object registry, cross-references that link objects representing the plurality of components such that the transformation instructions are queryable through the object registry by way of automation or a user interface;

matching an input structure of the first data map built for the source technology to an output structure that is usable by a target technology in a target computing environment;

extracting relevant transformation logic from the loaded definitions in the intermediary format as constrained by the conversion configuration information to thereby produce a generalized representation of the relevant transformation logic;

storing the generalized representation of the relevant transformation logic in an interpreted form;

identifying an intention of the transformation instructions, the identifying comprising:

querying, through the object registry, the loaded definitions in the intermediary format to ascertain relationships between input fields in the input structure of the first data map built for the source technology and output fields in the output structure that is usable by the target technology; and querying and manipulating the generalized representation of the relevant transformation logic in the interpreted form so as to identify a language the intention and store the intention in the interpreted form;

once the intention of the transformation instructions is identified, using the intention in the interpreted form to extract, from the relevant transformation logic in the interpreted form, required transformation logic as required by the target technology; and generating an artifact containing the required transformation logic, the artifact defining a second data map that is usable by the target technology to generate a transform runnable in the target computing environment.

9. The system of claim 8, wherein stored instructions are further translatable by the processor for:
compressing a plurality of instructions extracted from the definitions into a single instruction.

10. The system of claim 9, wherein compressing the plurality of instructions comprises at least one of removing an IF statement, combining statements, or reshaping the plurality of instructions.

11. The system of claim 8, wherein extracting the required transformation logic from the relevant transformation logic in the interpreted form comprises querying the relevant transformation logic in the interpreted form for statements describing behaviors of the target technology, the statements including at least one of a field mapping or looping.

12. The system of claim 8, wherein the source technology comprises a data-driven data transformation tool or a script-driven transformation tool.

13. The system of claim 8, wherein the target technology comprises a query-driven transformation tool.

14. The system of claim 8, wherein the interpreted form comprises an assumption, a rule, and a hint.

15. A computer program product comprising a non-transitory computer-readable medium storing instructions translatable by a processor for:
- loading, as specified in conversion configuration information, definitions of a first data map built for a source technology, the source technology specific to a source computing environment, the loading including representing the definitions as loaded definitions in an intermediary format, the definitions including transformation instructions having a plurality of components;
- building, through an object registry, cross-references that link objects representing the plurality of components such that the transformation instructions are queryable through the object registry by way of automation or a user interface;
- matching an input structure of the first data map built for the source technology to an output structure that is usable by a target technology in a target computing environment;
- extracting relevant transformation logic from the loaded definitions in the intermediary format as constrained by the conversion configuration information to thereby produce a generalized representation of the relevant transformation logic;
- storing the generalized representation of the relevant transformation logic in an interpreted form;
- identifying an intention of the transformation instructions, the identifying comprising:
  - querying, through the object registry, the loaded definitions in the intermediary format to ascertain relationships between input fields in the input structure of the first data map built for the source technology and output fields in the output structure that is usable by the target technology; and
  - querying and manipulating the generalized representation of the relevant transformation logic in the interpreted form so as to identify the intention of and store the intention in the interpreted form;
- once the intention of the transformation instructions is identified, using the intention in the interpreted form to extract, from the relevant transformation logic in the interpreted form, required transformation logic as required by the target technology; and
- generating an artifact containing the required transformation logic, the artifact defining a second data map that is usable by the target technology to generate a transform runnable in the target computing environment.

16. The computer program product of claim 15, wherein the instructions are further translatable by the processor for: compressing a plurality of instructions extracted from the definitions into a single instruction.

17. The computer program product of claim 16, wherein compressing the plurality of instructions comprises at least one of removing an IF statement, combining statements, or reshaping the plurality of instructions.

18. The computer program product of claim 15, wherein extracting the required transformation logic from the relevant transformation logic in the interpreted form comprises querying the relevant transformation logic in the interpreted form for statements describing behaviors of the target technology, the statements including at least one of a field mapping or looping.

19. The computer program product of claim 15, wherein the source technology comprises a data-driven data transformation tool or a script-driven transformation tool.

20. The computer program product of claim 15, wherein the target technology comprises a query-driven transformation tool.

* * * * *